United States Patent [19]

Park et al.

[11] Patent Number: 5,489,616
[45] Date of Patent: Feb. 6, 1996

[54] PROCESS FOR MANUFACTURING PHOSPHORIC ACID-TYPE CHELATE RESIN AS URANYL ION ABSORBENTS

[75] Inventors: In Hwan Park; Kil-Yeong Choi, both of Daejeon-Jikhalshi; Jin-Chul Jung, Pohang-Shi; Jae-Oh Joo, Daejeon-Jikhalshi, all of Rep. of Korea

[73] Assignee: Korea Research Institute of Chemical Technology, Daejeon, Rep. of Korea

[21] Appl. No.: 224,057

[22] Filed: Apr. 7, 1993

Related U.S. Application Data

[63] Continuation of Ser. No. 870,161, Apr. 15, 1992, abandoned, which is a continuation-in-part of Ser. No. 711,850, Jun. 7, 1991, abandoned.

[30] Foreign Application Priority Data

Jun. 7, 1990 [KR] Rep. of Korea ............... 90-8342

[51] Int. Cl.$^6$ ............... C08F 230/02; C08F 8/40; C08F 8/12
[52] U.S. Cl. ............... 521/32; 521/25; 521/30; 521/31; 525/333.3; 525/333.4; 525/333.6; 525/340; 526/274; 526/277; 526/278; 526/336; 526/338; 526/340; 526/347
[58] Field of Search ............... 521/31, 30, 32, 521/25; 526/278, 275; 525/340

[56] References Cited

U.S. PATENT DOCUMENTS

| | | | |
|---|---|---|---|
| 3,993,715 | 11/1976 | Hwa | 525/267 |
| 4,147,853 | 4/1979 | Goswami et al. | |
| 4,299,940 | 11/1981 | Wei | |
| 4,404,114 | 9/1983 | Mohr | 252/75 |
| 4,822,861 | 4/1989 | Rowe | 525/355 |
| 5,109,033 | 4/1992 | Grey et al. | |
| 5,116,882 | 5/1992 | Grey et al. | |

OTHER PUBLICATIONS

F. Helfferich, "Ion Exchange", 38–39, (1962) McGraw–Hill (New York).
M. Ehara et al., "Cation Exchange Resin Having Selective Adsorptivity for Polyvalent Ions", *Chemical Abstracts*, 82, 1975, No. 59356s, p. 98.
H. Egawa et al., "Preparation of Macroreticular Chelating Resins Containing Dihydroxyphosphino and/or Phosphono Groups and Their Adsorption Ability for Uranium", *Journal of Applied Polymer Science*, 29(6), 1984, pp. 2045–2055.
H. Egawa et al., "Studies on Selective Adsorption Resins.XXI.Preparation and Properties of Macroreticular Chelating Ion Exchange Resins Containing Phosphoric Acid Groups", *Journal of Applied Polymer Science*, 30, 1985, pp. 3239–3247.
J. Kennedy et al., "Syntheses of Metal–Complexing Polymers.I.Phosphorylated Polymers", *Journal of Applied Chemistry*, 8, 1958, pp. 459–464.
J. Kennedy and G. E. Ficken, "Syntheses of Metal–Complexing Polymers.II.Phosphonamide and α–Aminophosphonate Polymers", *Journal of Applied Chemistry*, 8, 1958, pp. 465–468.

Primary Examiner—Fred Zitomer
Attorney, Agent, or Firm—Kenyon & Kenyon

[57] ABSTRACT

This invention relates to a process of manufacturing phosphoric acid-type chelate resins as uranyl ion adsorbents having enhanced chelation and re-utilizing ability by introducing plenty of phosphoric acid groups both on main- and side-chain of the copolymer skeleton. The resin is prepared by both the radical suspension copolymerization of vinyl monomers such as styrene, divinylbenzene, and bis-(2-chloroethyl) vinylphosphonate and the additional introduction of phosphono group onto the copolymer.

17 Claims, No Drawings

PROCESS FOR MANUFACTURING PHOSPHORIC ACID-TYPE CHELATE RESIN AS URANYL ION ABSORBENTS

This application is a continuation of Ser. No. 07/870,161 filed on Apr. 15, 1992, itself abandoned herewith, which is a continuation-in-part of Ser. No. 07/711,850 filed on Jun. 7, 1991 and now abandoned.

FIELD OF THE INVENTION

This invention relates to a novel process for manufacturing phosphoric acid-type chelate resins useful for the adsorption of uranyl ions and more particularly, to a process for manufacturing phosphoric acid-type resins having improved chelate forming ability as follows:

A chelate resin bead is prepared by copolymerizing for example, monomers of styrene, divinylbenzene and a vinyl phosphonate monomer. Then, phosphono groups are additionally introduced to the phenyl side chain of the copolymer or to chloroalkyl groups introduced to the phenyl side chain. In this way, the basic copolymer of the chelate functional group enables a benzene unit to be in an uneven structure as a spacer and also to introduce said functional groups.

DESCRIPTION OF THE PRIOR ART

It is publicly known that one uranyl ion ($UO_2^{++}$) is chelated by two phosphono functional groups (Chem. Reproc. Irradi. Nuclear Fuel, 55, 64 (1977). An existing phosphoric acid-type chelate resin has been manufactured based upon the esterification of phosphoric acid to a polyol resin, [Kobunshi Kagaku, 10, 117 (1953), Ind. Eng. Chem., 46, 1042 (1954)] or based on the introduction of phosphono groups to the phenyl side groups of a styrene-divinylbenzene copolymer (U.S. Pat. No. 2,980,721, U.S. Pat. No. 2,764,562, Japanese Patent Laid Open No. 74-18719, and German Patent No. 2,500,744).

The former process has disadvantages in that hydrolysis in the presence of acidic or alkaline media causes a decrease in the number of phosphono groups and the effectiveness of the resin upon re-use is markedly reduced through repeated processes of adsorption-desorption.

The latter process also has disadvantages in that as far as the basic copolymer skeleton is concerned, the phosphono groups are wholly located on the phenyl side chains of said copolymer resin and there is little space for relevant functional groups to be properly introduced.

As a consequence, this process also suffers from a substantial decrease in the ability to form chelates with the uranium ion.

SUMMARY OF THE INVENTION

Therefore, for the adsorption of uranyl ions, there has been interest in further improved processes to develop phosphoric acid-type chelate resins. Under such circumstances, the phosphoric acid-type chelate resin of the present invention for the adsorption of uranyl ions has a distinct advantage: the resin has phosphono groups directly bonded to carbon atoms in a copolymer resin, and phosphono groups are introduced to the main- and side-chains comprising the basic skeleton of the copolymer resin.

Previously, in the manufacture of such phosphoric acid-type chelate resins, phosphono groups have been introduced to the copolymer resin obtained from styrene and divinylbenzene.

However, such a process only deals with the method of introducing phosphono groups to the phenyl groups themselves in the side of copolymer resin, or of introducing phosphono groups after chloromethylation of the phenyl groups. [J. Appl. Polym. Sci., 29, 2045 (1984)].

Thus, the existing methods relate entirely to the introduction of phosphono groups only to phenyl groups that are side chains of the basic skeleton of the copolymer resin. The reaction of phosphono groups with phenyl groups is quite difficult owing to the steric hindrance of the ortho-position of the phenyl group, and phosphono groups are chiefly introduced to the para-position. Since the phosphono groups introduced to the phenyl groups are arranged in one position only, judging from the basic copolymer skeleton, it is shown that the steric dispersion effect of phosphono groups, chelate-forming functional groups, and the chelate-forming ability with uranyl ions is markedly decreased.

DETAILED DESCRIPTION

This invention is described in detail as follows:

This invention relates to a process of manufacturing chelate resins as uranyl ion adsorbents, in the following manner:

monomers such as styrene, divinylbenzene, and bis(2-chloroethyl) vinylphosphonate (hereinafter referred to as "CEVP") as a kind of vinylphosphonate monomer are copolymerized by suspension polymerization;

this copolymerized material is hydrolyzed to manufacture a copolymer;

phosphorus trichloride is reacted with phenyl groups that are side chains of the basic copolymer skeleton, or with chloroalkyl groups introduced to said phenyl groups.

This invention is described in more detail as follows:

This invention relates to a process of manufacturing chelate resins as uranyl ion adsorbenes, wherein monomers such as styrene, divinylbenzene and CEVP convertible to phosphono groups are copolymerized and hydrolyzed and oxidized to form chelate-forming phosphono groups within the basic skeleton of the copolymer resins.

Then, phosphorus trichloride is again reacted with phenyl groups that are side chains of the basic copolymer skeleton, or with chloroalkyl groups introduced to said phenyl groups, thus being convertible to phosphono groups designed for the formation of chelates. Hydrolysis and oxidation is finally made to obtain the substituted phosphono groups.

The chelate copolymer resin has phosphono groups both on the main chain and on the side chain of its basic skeleton, and the chelate-forming ability is markedly enhanced by the uneven structure marking the apex of the phenyl groups that are side chains of the copolymer resin, or phosphono groups substituted on chloroalkyl groups introduced to said phenyl groups.

In addition, since the phosphoric acid-type chelate resin of this invention has a structure in which phosphono groups are directly bonded with carbon atoms, the phosphono groups are not easily hydrolyzed in the presence of acidic or alkaline solution, when adsorption-desorption processes are conducted for re-utilization.

Therefore, the structure makes it possible to exhibit improved chelate-forming ability and to undergo repeated re-utilization.

The following denotes the schematic processes for the manufacture of phosphoric acid-type chelate resins according to the method of this invention.

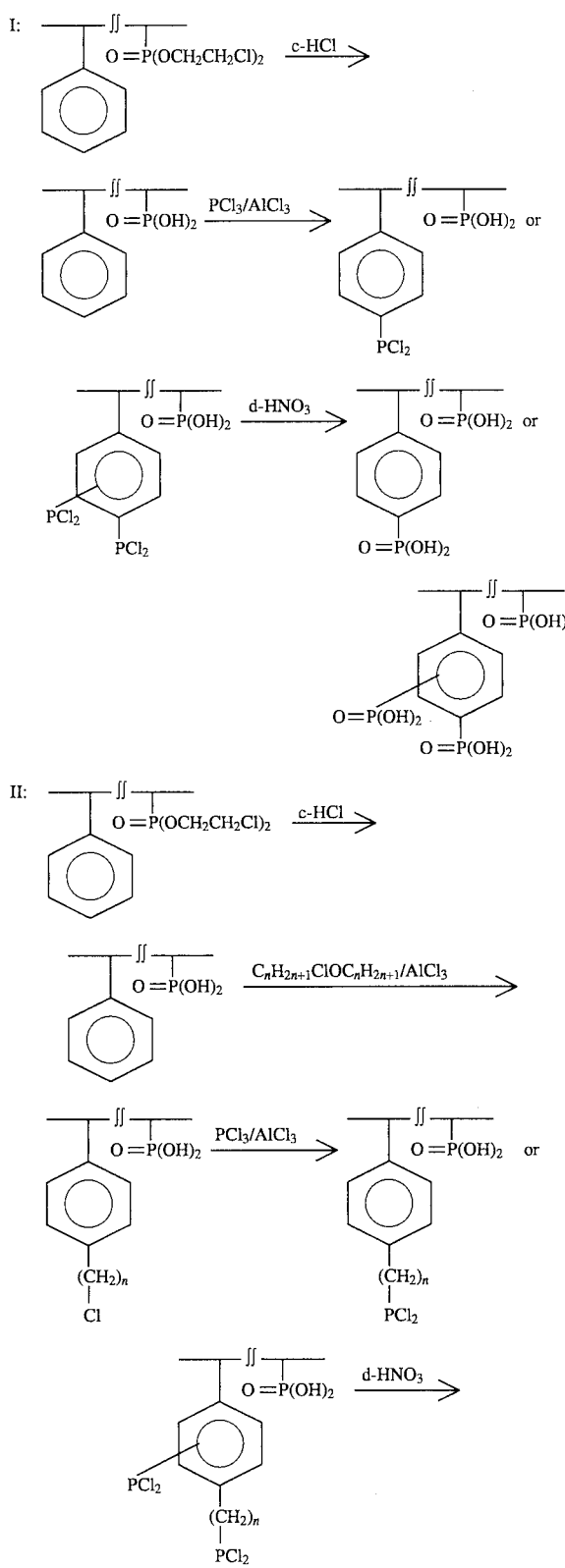
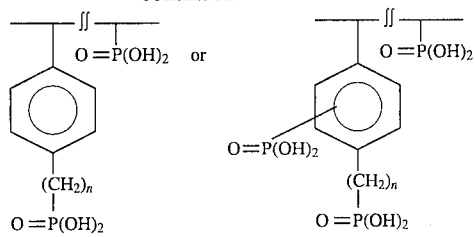

This invention is described in more detail in the following manner:

First, toluene is added as a diluent to monomers such as styrene, divinylbenzene, and CEVP (alkylvinylphosphonates such as dimethylvinlyphosphonate diethylvinlyphosphonate, dipropylvinylphosphonate, dibutylvinylphosphonate, and diphenylvinylphosphonate are also included). Then, this material is copolymerized with a radical initiator by suspension copolymerization at 40°–100° C. for 2–50 hrs. The obtained copolymer resin is hydrolyzed at 40°–130° C. for 1–60 hrs under acidic catalyst to manufacture a resin containing phosphono groups on the main chain of copolymer resin.

The above copolymerization between the hydrophilic CEVP monomer and the lipophilic styrene monomer proceeds via suspension copolymerization to form a copolymer of a spherical type; plenty of lipophilic styrene components should be contained in the inner side of the spherical structure, while plenty of hydrophilic CEVP groups should be distributed on the outer side.

Since the CEVP groups used in the introduction of functional (phosphono) groups designed for the adsorption of uranyl ions are much more distributed on the spherical surface of the chelate resin, more phosphono groups than the expected mean value are introduced to the spherical surface.

Phosphorus trichloride is then reacted at 40°–100° C. for 2–50 hrs with the phenyl groups that are side chains of the basic copolymer skeleton, or with chloroalkyl groups introduced to said phenyl groups, and hydrolyzed and oxidized at 40°–130° C. for 1–60 hrs in the presence of acid catalyst, thereby introducing plenty of phosphono groups into the copolymer resin. Thus, a phosphoric acid-type chelate resin exhibiting a more enhanced chelate-forming ability can be manufactured in that an uneven structure is made available between phosphono groups on the main chain and other phosphono groups introduced to phenyl groups that are side chains of said copolymer resin.

According to this invention, CEVP as a type of vinylphosphonate is preferably used within 45 mol % (max. composition in solution copolymerization) of total copolymer compositions. If the content of the CEVP is more than 45 mol %, the copolymer yield will decrease and reaction time will become longer since there are some undesirable problems associated with CEVP during copolymerization process of vinyl monomers, for example, steric hindrance of CEVP structure, possibility of CEVP homopolymerization, chain-transfer reaction of CEVP, etc.

Divinylbenzene, a cross linking agent in this invention, is preferably used within 2.0–30 weight percent of the total amount of monomers used.

Divinylbenzene gives a mechanical strength of styrene-type spherical copolymers, and performs as a ladder of a net-shaped structure where uranyl ions can freely enter. If the content of divinylbenzene is less than 2.0–30 percent, the net-shaped structure cannot play a role as a ladder. However, if excessive, the heavy cross-linking of divinylbenezene makes its surface area small and also reduces adsorption effects.

And as for the copolymerization reaction in this invention, small amounts of organic diluents such as toluene and cyclohexane are preferably used within 2.0–20 weight percent of the total amount of used monomers. During the copolymerization reaction, they play a role as precipitating agents to form the physical uneven structure of spherical copolymer. After reaction, the diluents are physically mixed within the spherical copolymer and when dried, their specific surface areas become enlarged.

A radical polymerization method is also used as the copolymerization method of this invention. Radical initiators used are benzoylperoxide, p,p'-dichlorobenzoylperoxide, methylethylketoneperoxide, cumenehydroperoxide, ditbutylperoxide, potassium persulfate, and ammonium persulfate; as an azo-type radical initiator, bisazoisobutylonitrile is used.

A radical suspension polymerization method is also used as the copolymerization method of this invention. Suspension agents used are methylcellulose, partially-hydrolyzed polyvinyl alcohol, polyvinylpyrrolidone or their mixtures. The suspension agent is preferably used here within 0.01–4.0 weight percent of the total amount of monomers used, and more preferably within 0.1–2.0 weight percent.

In general, since the suspension copolymerization occurs in an aqueous dispersion, the radical copolymerization method of this invention also occurs in an aqueous dispersion. Thus, the preferred weight ratio of water to organic monomers is preferably within the range of 0.5–15.

If the water-to-monomer weight ratio is less than 0.5, a uniform aqueous dispersion cannot be obtained owing to higher viscosity. However, should a water-to-monomer weight ratio greater than 15 be used, the productivity will decrease. And furthermore, energy consumption will inevitably increase due to the fact that large amounts of water should be heated.

This invention provides that the particle size of the spherical copolymer may be controlled by a) the amount of the suspension agent and b) the weight ratio between water and organic monomers in an aqueous dispersion.

The process for the hydrolysis of the phosphoric acid type copolymer obtained from this invention is conducted as follows: in proportion to a unit weight of dried copolymer resin, are added ethanol of 2–10-fold weight ratio. Then, this mixture is maintained at 40°–130° for 1–6 hrs. Thereafter, purification is conducted by evaporating the volatile components, washing the residue with water and methanol, then drying.

One method of introducing phenyl groups as side chains of the phosphoric acid-type copolymer, or a method of additionally introducing phosphono groups from chloroalkyl groups introduced to said phenyl groups, is conducted as follows: in proportion to a unit weight of dried copolymer resin, phosphorus trichloride of 0.01–15-fold weight ratio in cyclohexane solution of 2–20-fold weight ratio is used for a Friedel-Crafts reaction at 40°–100° C. for 2–50 hrs in the presence of aluminum chloride catalyst of 0.01–15-fold weight ratio. Also, the introduction of chloroalkyl groups to phenyl groups that are side chains of the basic copolymer resin skeleton, is conducted based on the following reaction: in proportion to a unit weight of the copolymer, a chloralkylakylether of 0.01–15-fold weight ratio in cyclohexane solution of 1–30-fold weight ratio is reacted at 40°–100° C. for 2–50 hrs using an aluminum chloride catalyst of 0.01–10-fold weight ratio. Then, this reaction mixture is separated by filtration and washed with distilled water and methanol. For the activation of phosphino groups into phosphono groups, nitric acid of 1–30 weight percent concentration is added in a ratio of 2–50-fold weight ratio in proportion to a unit weight of said reaction mixture. Thereafter, hydrolysis and oxidation is simultaneously carried out at 40°–130° C. for 1–60 hrs. The final product obtained hereto is filtered, washed with water and methanol, and dried.

In accordance with the invention as described above, the functional structure of tributylphosphate may be used for the recovery of uranyl ion. Therefore, the manufacture of phosphoric acid-type chelate resins according to this invention should consider the following points: a) when the coordination region about the functional part of the chelate (O=P structure) is planned, a phosphono structure considered to have the same structure as tributylphosphate against uranyl ion should be selected; and b) the influence of phosphono group content, the relative numbers of phosphono groups on the main- or side-chain of basic chelate copolymer skeleton, the amount of cross-linking agent, the specific surface area and the ability to reuse the resin after adsorption-desorption.

Taking the above points into due consideration, the manufacture of said phosphoric acid-type chelate resin, showing a better adsorptivity against the uranyl ion and remarkably improved re-utilizing ability, is made available.

The following examples illustrate ways in which the principle of this invention has been applied, but are not to be-construed as limiting its scope.

EXAMPLES 1–10

To a reactor having a stirrer were added styrene, divinylbenzene, bis-(2-chloroethyl) vinylphosphonate (CEVP), and toluene. 0.2 weight percent of benzoyl peroxide was added as an initiator against the above monomers. The water ratio (α value) against the above monomers waste 2.5, and 1% aqueous methyl cellulose solution was used as a dispersion agent.

The suspension polymerization was carried out at 70° C. for 25 hrs, and the produced polymer was filtered, washed with water, dried in a vacuum oven at 60° C. for 48 hrs, and passed through a sieve of 50/80 mesh.

In proportion to the unit weight of dried resin obtained from said polymerization, were added methanol of 4-fold weight ratio and concentrated hydrochloric acid of 3-fold weight ratio. This reaction mixture was refluxed and hydrolyzed at 90° C. for 42 hrs. For the purification, the volatile components were evaporated, the residue was washed with water, and dried.

Thereafter, the introduction of phosphono groups at the phenyl groups is made available in the following manner: In the proportion to the unit weight of chelate resin having the phosphono groups only on the main chain, phosphorus trichloride of 0.25-fold weight ratio in cyclohexane solution of 8-fold weight ratio was reacted at 70° C. for 30 hrs, under the presence of aluminum chloride catalyst of 0.25-fold weight ratio. The reaction mixture was separated by filtration, washed with water/methanol, and dried. In proportion to the unit weight of dried intermediate, 2% nitric acid solution of 10-fold weight ratio was reacted for its simultaneous hydrolysis and oxidation at 80° C. for 20 hrs. After drying at 60° C. for 48 hrs, a yellow-colored spherical chelate resin was obtained. With reference to said resin, Table 1 shows its composition, phosphorus content, and adsorption capacity for uranium ions.

COMPARISON EXAMPLES 1–5

To a reactor having a stirrer were added styrene, divinylbenzene and toluene, and 0.2 weight percent of benzoyl peroxide as an initiator against the above monomers. The water ratio ($\alpha$ value) against the above monomers was adjusted to 2.5, and 1% aqueous methyl cellulose solution was used as a dispersion agent.

The suspension polymerization was carried out at 70° C. for 25 hrs, and the produced polymer was filtered, washed with water, dried in a vacuum oven at 60° C. for 48 hours, and passed through a sieve of 50/80 mesh.

Thereafter, the introduction of phosphono groups at the phenyl groups is made available in the following manner: In proportion to the unit weight of dried resin obtained from said polymerization, phosphorus trichloride of 0.25-fold weight ratio from cyclohexane solution of 80 fold weight ratio from cyclohexane solution of 8-fold weight ratio was reacted at 70° C. for 30 hrs, under the presence of aluminum chloride catalyst of 0.25-fold weight ratio. The reaction mixture was separated by filtration, washed with water/methanol, and dried. In proportion to the unit weight of dried intermediate, 2% nitric acid solution of 10-fold weight ratio was reacted for its simultaneous hydrolysis and oxidation at 70° C. for 20 hrs. After drying at 60° C. for 48 hours, a yellow-colored spherical chelate resin was obtained. With reference to said resin, Table 2 shows its composition, phosphorus content, and adsorption capacity for uranyl ions.

COMPARISION EXAMPLES 6–10

To a reactor having a stirrer were added styrene, divinylbenzene and CEVP, and toluene. 0.2 weight percent of benzoyl peroxide was added as an initiator against the above monomers. The water ratio ($\alpha$ value) against the above monomers was adjusted to 2.5, and 1% aqueous methyl cellulose solution was used as a dispersion agent.

The suspension polymerization was carried out at 70° C. for 25 hours, and the produced polymer was filtered, washed with water, dried in a vacuum oven at 60° C. for 48 hrs, and passed through sieve of 50/80 mesh.

In proportion to the unit weight of dried resin obtained from said polymerization, were added methanol of 4-fold weight ratio and concentrated hydrochloric acid of 3-fold weight ratio. This reaction mixture was refluxed and hydrolyzed at 90° C. for 42 hrs. For the purification, the volatile components were evaporated, the residue was washed with water, and dried.

Thereafter, the introduction of phosphono groups at the phenyl groups is made available in the following manner: In proportion to the unit weight of chelate resin having the phosphono group only on the main chain, chloromethylmethylether of 1-fold weight ratio in cyclohexane solution of 10-fold weight ratio was reacted at 80° C. for 20 hrs, under the presence of aluminum chloride catalyst of 0.3fold weight ratio. The reaction mixture was filtrated and dried in a vacuum oven at 50° C. for 48 hrs.

Thereafter, the introduction of phosphono groups at the chlorbenzyl groups is made available in the following manner: In proportion to the unit weight of chelate resin having the phosphono groups only on the main chain phosphorus trichloride of 0.25-fold weight ratio in cyclohexane solution of 8-fold weight ratio was reacted at 80° C. for 30 hrs, under the presence of aluminum chloride catalyst of 0.25-fold weight ratio. The reaction mixture was separated by filtration, washed with water/methanol, and dried. In proportion to the unit weight of dried intermediate a 2% nitric acid solution of 10-fold weight ratio was reacted for its simultaneous hydrolysis and oxidation at 80° C. for 20 hrs. After drying at 60° C. for 48 hrs, a yellow-colored spherical chelate resin was obtained. With reference to said resin, Table 2 shows its composition, phosphorus content, and adsorption capacity for uranyl ion.

The adsorption capacity for uranyl ions was calculated from the difference in concentration after adding 0.2 g of each sample to 20 ml uranyl ion solution (ph 4.27 and 21.20 ppm of uranyl ion), and stirring for 28 hrs.

TABLE 1

| | Phosphoric acid-type chelate resin | | | | | Adsorption capacity for uranyl ion[a] ($\mu$g/mg-resin) | |
|---|---|---|---|---|---|---|---|
| | Composition (mol ratio) | | | Phosphorus content[d] ($\mu$g/mg-resin) | | product | |
| Example | styrene | divinylbenzene[b] | bis-(2-chloroethyl) vinylphosphonate[c] | main chain | side chain | new product | reutilized 4 times |
| 1 | 1 | 0.1467 (14.8)[e] | 0.0251 | 4.2 | — | 0.08 | 0.08 |
| 2 | 1 | 0.1660 (15.1) | 0.0746 | 9.8 | — | 0.59 | 0.57 |
| 3 | 1 | 0.2122 (15.7) | 0.1878 | 19.6 | — | 0.72 | 0.69 |
| 4 | 1 | 0.2593 (16.0) | 0.3153 | 23.8 | — | 0.51 | 0.50 |
| 5 | 1 | 0.3259 (16.4) | 0.4780 | 27.2 | — | 0.49 | 0.45 |
| 6 | 1 | 0.1467 (14.8) | 0.0251 | 4.2 | 19.9 | 0.58 | 0.55 |
| 7 | 1 | 0.1660 (15.1) | 0.0746 | 9.8 | 14.3 | 0.87 | 0.86 |
| 8 | 1 | 0.2122 (15.7) | 0.1878 | 19.6 | 10.9 | 1.49 | 1.47 |
| 9 | 1 | 0.2593 (16.0) | 0.3153 | 23.8 | 7.3 | 1.14 | 1.13 |
| 10 | 1 | 0.3259 (16.4) | 0.4780 | 27.2 | 3.2 | 1.06 | 1.02 |

[a]Resin 0.2 g, 20 ml of 21.2 ppm $UO_2^{2+}$ solution (pH 4.27), room temp. 28 h.
[b]Calculated from the feed compositions of raw materials.
[c]Calculated from phosphorus analysis.
[d]Calculated from the weights changed before and after the reactions.
[e]Weight percent.

TABLE 2

| | Phosphoric acid-type chelate resin | | | | | Adsorption capacity for uranyl ion[a] (μg/mg-resin) | |
|---|---|---|---|---|---|---|---|
| | Composition (mol ratio) | | | Phosphorus content[c] (μg/mg-resin) | | | product |
| Example | styrene | divinyl-benzene[b] | bis-(2-chloroethyl) vinylphosphonate | main chain | side chain | new product | reutilized 4 times |
| 1 | 1 | 0.0959 (10.7)[d] | — | — | 28.0 | 0.21 | 0.21 |
| 2 | 1 | 0.1227 (13.3) | — | — | 26.3 | 0.23 | 0.22 |
| 3 | 1 | 0.1410 (15.0) | — | — | 25.1 | 0.25 | 0.24 |
| 4 | 1 | 0.1725 (17.7) | — | — | 24.2 | 0.22 | 0.22 |
| 5 | 1 | 0.2163 (21.3) | — | — | 23.4 | 0.18 | 0.17 |
| 6 | 1 | 0.1467 (14.8) | 0.0251 | 4.2 | 32.9 | 0.62 | 0.61 |
| 7 | 1 | 0.1660 (15.1) | 0.0746 | 9.8 | 26.4 | 0.82 | 0.80 |
| 8 | 1 | 0.2122 (15.7) | 0.1878 | 19.6 | 14.8 | 1.32 | 1.31 |
| 9 | 1 | 0.2593 (16.0) | 0.3153 | 23.8 | 7.9 | 1.13 | 1.12 |
| 10 | 1 | 0.3259 (16.4) | 0.4780 | 27.2 | 2.9 | 1.09 | 1.07 |

[a]Resin 0.2 g, 20 ml of 21.2 ppm $UO_2^{2+}$ solution (pH 4.27), room temp. 28 h.
[b]Calculated from the feed compositions in raw materials.
[c]Calculated from the weights changed before and after the reactions.
[e]Weight percent.

What is claimed is:

1. A process for manufacturing phosphono-group-containing chelate resin for use as an uranyl ion adsorbent comprising the steps of:
   copolymerizing monomers of styrene, divinylbenzene, and bis-(2-chloroethyl) vinylphosphonate by suspension at 40° to 100° C. for 2 to 50 hours to form a polymer;
   hydrolyzing the phosphonate-containing monomers of said polymer at 40° to 130° C. for 1 to 60 hours to generate phosphono groups therein;
   reacting phosphorous trichloride at 40° to 100° C. for 2 to 50 hours with phenyl group side chains of said phosphono group-containing polymer or with chloroalkyl groups introduced previously into said phenyl groups, and then
   hydrolyzing and oxidizing said phosphorous-containing groups thereof at 40° to 100° C. for 1 to 60 hours to obtain said chelate resin.

2. The process of claim 1 wherein the amount of said bis-(2-chloroethyl) vinylphosphonate incorporated into said polymer consists of less than 45 mol percent of total copolymer composition, and wherein said divinylbenzene so incorporated is present at between 2 and 30 weight percent of the total amount of incorporated monomer.

3. The process of claim 1 wherein, in proportion to the unit weight of copolymer reacted therewith, phosphorus trichloride at 0.05 to 15-fold weight ratio is dissolved in a cyclohexane solution of 2 to 20-fold weight ratio in the presence of aluminum chloride catalyst of 0.01 to 10-fold weight ratio.

4. The process of claim 1 wherein, with respect to the introduction of chloroalkyl groups to phenyl groups thereof, the proportion of choloroalkylalkylether used to the unit weight of copolymer is 0.05 to 15-fold and wherein cyclohexane solution is used at a weight ratio of 1 to 30-fold in the presence of aluminum chloride catalyst at 0.01 to 10-fold weight ratio.

5. The process of claim 1 wherein, with respect to the hydrolysis and oxidation reactions thereof carried out in nitric acid, the proportion by weight of nitric acid in said nitric acid solution is 1 to 30 weight percent and wherein said solution is used at a 2 to 50-fold weight ratio to said copolymer reacted therewith.

6. In a process of manufacturing a phosphono-group-containing chelate resin consisting essentially of copolymerized styrene, divinylbenzene and vinyl phosphonate, said resultant resin being effective for the adsorption of uranyl ions, the improvement comprising introducing phosphono groups into the phenyl side chains of said resin or into alkyl groups attached to said phenyl side chains.

7. A method according to claim 6 wherein said vinyl phosphonate is bis-(2-chloroethyl) vinyl phosphonate.

8. A method according to claim 6 wherein said vinyl phosphate is an alkylvinyl phosphonate or arylvinyl phosphonate.

9. In a process of manufacturing a phosphono-group-containing chelate resin comprising copolymerized divinylbenzene and styrene and containing phosphono groups attached thereto, said resultant resin being effective for the adsorption of uranyl ions, comprising introducing vinyl phosphonate monomers into the copolymer.

10. A method according to claim 4 wherein said vinyl phosphonate is bis-(2-chloroethyl) vinyl phosphonate.

11. A method according to claim 4 wherein said vinyl phosphate is an alkylvinyl phosphonate or arylvinyl phosphonate.

12. A process for preparing a chelating resin comprising the steps of:
   copolymerizing styrene, divinylbenzene and substituted vinylphosphonate;
   hydrolyzing the substituted phosphonate groups in the resultant copolymer to phosphono groups;
   optionally, introducing alkyl substituents onto phenyl side chains of said polymer;
   reacting the resultant polymer with $PCl_3$ to attach $PCl_2$ groups directly to said phenyl side chains or to alkyl substituents thereon; and
   hydrolyzing and oxidizing the resultant $PCl_2$ groups to form additional phosphono groups.

13. A process for manufacturing a chelate resin for use as an uranyl ion adsorbent comprising the steps of:
   copolymerizing monomers of styrene, divinylbenzene, and bis-(2-chloroethyl) vinylphosphonate by suspension at 40° to 100° C. for 2 to 50 hours to form a polymer;

hydrolyzing the phosphonate-containing monomers of said polymer at 40° to 130° C. for 1 to 60 hours to generate phosphono groups therein;

reacting phosphorous trichloride at 40° to 100° C. for 2 to 50 hours with phenyl group side chains of said phosphono group-containing polymer or with chloroalkyl groups introduced previously into said phenyl groups, and then hydrolyzing and oxidizing said phosphorous-containing groups thereof at 40° to 100° C. for 1 to 60 hours to obtain said chelate resin, wherein the amount of said bis-(2-chloroethyl) vinylphosphonate incorporated into said polymer consists of less than 45 mol percent of total copolymer composition, and wherein said divinylbenzene so incorporated is present at between 2 and 30 weight percent of the total amount of incorporated monomer.

14. A process for manufacturing a phosphoric acid-type chelate resin useful as a uranyl ion adsorbent comprising the steps of:

copolymerizing monomers of styrene, divinylbenzene, and bis-(2-chloroethyl) vinylphosphonate by suspension at 40° to 100° C. for 2 to 50 hours to form a polymer wherein said monomers combine into said polymer in the mole ratio of about 1 part of styrene, to about 0.21 to 0.26 part of divinylbenzene, to about 0.18 to 0.32 part of said bis-(2-chloroethyl) vinylphosphonate;

hydrolyzing the phosphonate-containing monomeric units of said polymer at 40° to 130° C. for t to 60 hours to generate phosphono groups therein;

reacting phosphorous trichloride at 40° to 100° C. for 2 to 50 hours with phenyl group side chains of said phosphono group-containing polymer, and then hydrolyzing and oxidizing said phosphorouscontaining groups thereof at 40° to 100° C. for 1 to 60 hours to obtain said phosphoric acid-type chelate resin.

15. A method according to claim 9 wherein chloroalkyl groups are introduced into phenyl groups of said polymer prior to reacting said polymer with phosphorous trichloride and wherein said monomers combine into said polymer in the mole ratio of about 1 part of styrene, to about 0.21 to 0.26 part of divinylbenzene, to about 0.18 to 0.32 part of said bis-(2-chloroethyl) vinylphosphonate.

16. The process of claim 1 wherein the amount of said bis-(2-chloroethyl) vinylphosphonate incorporated into said polymer consists of less than about 26 mol percent of total copolymer composition, and wherein said divinylbenzene so incorporated is present at between 2 and 30 weight percent of the total amount of incorporated monomer.

17. A process for manufacturing a chelate resin for use as an uranyl ion adsorbent comprising the steps of:

copolymerizing monomers of styrene, divinylbenzene, and bis-(2-chloroethyl) vinylphosphonate by suspension at 40° to 100° C. for 2 to 50 hours to form a polymer;

hydrolyzing the phosphonate-containing monomers of said polymer at 40° to 130° C. for 1 to 60 hours to generate phosphono groups therein;

reacting phosphorous trichloride at 40° to 100° C. for 2 to 50 hours with phenyl group side chains of said phosphono group-containing polymer or with chloroalkyl groups introduced previously into said phenyl groups, and then hydrolyzing and oxidizing said phosphorouscontaining groups thereof at 40° to 100° C. for 1 to 60 hours to obtain said chelate resin, wherein the amount of said bis-(2-chloroethyl) vinylphosphonate incorporated into said polymer consists of less than about 26 mol percent of total copolymer composition, and wherein said divinylbenzene so incorporated is present at between 2 and 30 weight percent of the total amount of incorporated monomer.

* * * * *